(12) United States Patent
Royak et al.

(10) Patent No.: US 8,009,450 B2
(45) Date of Patent: Aug. 30, 2011

(54) METHOD AND APPARATUS FOR PHASE CURRENT BALANCE IN ACTIVE CONVERTER WITH UNBALANCED AC LINE VOLTAGE SOURCE

(75) Inventors: Semyon Royak, Beachwood, OH (US); Robert J. Breitzmann, South Russell, OH (US); Mark M. Harbaugh, Richfield, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 426 days.

(21) Appl. No.: 12/198,338

(22) Filed: Aug. 26, 2008

(65) Prior Publication Data

US 2010/0054004 A1 Mar. 4, 2010

(51) Int. Cl.
H02M 7/44 (2006.01)
(52) U.S. Cl. ........................................... 363/84; 363/89
(58) Field of Classification Search .................... 363/84, 363/87, 89
See application file for complete search history.

(56) References Cited

U.S. PATENT DOCUMENTS

| | | | |
|---|---|---|---|
| 5,796,236 A | 8/1998 | Royak | |
| 6,052,297 A * | 4/2000 | Akamatsu et al. | 363/84 |
| 6,636,012 B2 | 10/2003 | Royak et al. | |
| 6,703,809 B2 | 3/2004 | Royak et al. | |
| 6,831,440 B1 | 12/2004 | Royak et al. | |
| 7,106,024 B2 | 9/2006 | Harbaugh et al. | |
| 7,336,509 B2 * | 2/2008 | Tallam | 363/37 |
| 7,355,865 B2 | 4/2008 | Royak et al. | |
| 7,733,677 B2 * | 6/2010 | Cheng | 363/84 |
| 2005/0207192 A1 * | 9/2005 | Fu et al. | 363/89 |
| 2006/0034104 A1 * | 2/2006 | Royak et al. | 363/39 |
| 2007/0291426 A1 | 12/2007 | Kasunich et al. | |
| 2008/0094015 A1 | 4/2008 | Royak et al. | |
| 2008/0130335 A1 * | 6/2008 | Yuzurihara et al. | 363/125 |
| 2010/0054004 A1 * | 3/2010 | Royak et al. | 363/125 |

* cited by examiner

*Primary Examiner* — Jeffrey L Sterrett
(74) *Attorney, Agent, or Firm* — Fay Sharpe, LLP; Alexander R. Kuszewski; John M. Miller

(57) ABSTRACT

Active power converters and methods are presented for converting input electrical power to output electrical power with converter switching control in which the individual phase voltage command values are compensated according to phase line voltage imbalances to compensate the converter control to provide balanced phase currents in the presence of unbalanced phase supply line voltages.

20 Claims, 7 Drawing Sheets

METHOD AND APPARATUS FOR PHASE CURRENT BALANCE IN ACTIVE CONVERTER WITH UNBALANCED AC LINE VOLTAGE SOURCE

FIELD OF THE INVENTION

The present invention relates generally to electrical power conversion systems and more particularly to active converters with phase current balancing.

BACKGROUND OF THE INVENTION

Power conversion systems are used in supplying power to a grid, in driving electric motors, and in other applications in which electrical power must be converted from one form to another. Typically, the power converter is constructed using electrical switches actuated in a controlled fashion to selectively convert input power to output power of a desired form such as single or multi-phase AC of a controlled amplitude, frequency and phase to drive an AC motor according to a desired speed and/or torque profile, often in the presence of varying load conditions. Many motor drives include an initial AC to DC power conversion stage that receives multiphase AC voltage from a power source and employs selectively actuated electrical switching devices (e.g., IGBTs, etc.) to perform a controlled rectification to provide DC power on a bus. In many applications, the DC bus is then inverted by another set of controlled switches to provide an output AC (single or multiphase) to drive an AC load, such as an electric motor or a power grid. The initial AC to DC conversion stage may include inductors in the input phase lines to allow generation of DC voltages higher than the peak AC input voltages, thereby facilitating provision of output/load power at any suitable levels. Often, however, the phase voltages from the AC power supply are unbalanced. Even small source voltage imbalance in an AC power converter can result in large discrepancies between phase currents, depending on the filter impedances at the input to the converter. Large differences in the converter phase currents, in turn, can result in stresses to switching components (e.g., IGBTs) of corresponding phase branches in the AC to DC conversion. Accordingly, designers of power conversion systems must either oversize the switches to accommodate source imbalance situations or operate the converter below rated output to prevent switching component damage or degradation. Moreover, voltage imbalance situations may exacerbate the generation of undesired harmonic content by the converter, particularly second harmonics that exceed tolerable levels. U.S. Pat. No. 7,355,865 to Royak et al., assigned to Rockwell Automation Technologies, Inc., provides for control of second order harmonics in voltage imbalance situations by using current regulation in the stationary reference frame, the entirety of which patent is hereby incorporated by reference herein. However, this approach may be limited to certain AC line applications to prevent instability. Accordingly, there remains a need for improved apparatus and techniques for power conversion system phase current balancing for source voltage imbalance situations.

SUMMARY OF INVENTION

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The present disclosure involves conversion of multiphase electrical power to DC output power by selective switching control using voltage command values compensated relative to calculated peak phase voltage values and optionally adjusted based on computed RMS phase current errors in order to balance phase currents in the presence of unbalanced phase supply line voltages. In accordance with one or more aspects of the disclosure, an active power conversion system is provided that includes a converter having an array of switches operatively coupled between the converter input and output, as well as a control system that provides switching control signals to convert multiphase input power to output DC power. The control system includes a current balancing component that controls the converter switches to balance phase currents in the presence of unbalanced phase supply line voltages by determining DC voltage trim values for each phase at least partially according to the measured phase supply line voltages and operating the switching devices according to a phase command signal based at least partially on a phase voltage reference command value and the DC voltage trim value for each phase. The controller determines d and q axis voltage command values in a synchronous reference frame based on measured line voltages and converts these to voltage reference command values for each phase. DC voltage trim values are determined for each phase based at least partially on the measured phase supply line voltages, and phase command signals are derived at least partially according to the phase voltage reference command value and the DC voltage trim value for each phase, with the controller providing the converter switching control signals at least partially according to the phase command signals to provide balanced phase currents.

The current balancing component in one implementation includes a unity voltage reference component, a DC trim component, a trim conversion component, and a phase voltage compensation component. The unity voltage reference component determines a peak voltage value in a stationary reference frame based at least partially on synchronous reference frame voltage command values and determines unity voltage reference values as a ratio of the phase voltage reference command value to the peak voltage value for each phase. The DC trim component includes a feedforward voltage trim component which determines a peak average of the phase supply line voltages and derives a DC voltage trim value as the difference between the peak average of all the phase supply line voltages and the peak value of the individual phase supply line voltage for each phase. The trim conversion component multiplies the unity voltage reference value by the DC voltage trim value to convert the DC voltage trim values to AC voltage trim values for each phase, and the phase voltage compensation component determines the phase command signals for each phase as the difference between the voltage reference value and the AC voltage trim value. The feedforward voltage trim calculation component may be further operative to convert measured RMS line-to-line voltages to phase AC peak voltages. In addition, the DC trim component in certain embodiments adjusts the DC voltage trim value at least partially according to an RMS current error value to derive an adjusted DC voltage trim value for each phase, and the trim conversion component multiplies the unity voltage reference value by the adjusted DC voltage trim value to determine the AC voltage trim values for each phase. The DC trim component may also include an RMS current regulator component that determines an RMS current reference value based at least partially on d and q axis current command values and determines the RMS current error value at least partially according to the difference between the RMS current reference value and a calculated RMS phase current value for each phase.

In accordance with further aspects of the disclosure, a method is provided for controlling an active power converter. The method includes measuring phase input supply line voltages, determining d and q axis voltage command values in a synchronous reference frame based at least partially on the measured phase supply line voltages, and converting these to reference command values for each phase. The method further involves determining DC voltage trim values for each phase at least partially according to the measured phase supply line voltages, determining a phase command signal based at least partially on the phase voltage reference command value and the DC voltage trim value for each phase, and controlling the active power converter based at least partially on the phase command signals. The method may also include determining a peak voltage value in the stationary reference frame based at least partially on the synchronous reference frame voltage command values, determining unity voltage reference values for each phase as the ratio of the phase voltage reference command value to the peak voltage value, and determining a peak average of the phase supply line voltages. In addition, the method may include determining the DC voltage trim value as the difference between the peak average of all the phase supply line voltages and the peak value of the individual phase supply line voltage for each phase, as well as conversion of the DC voltage trim values to AC voltage trim values by multiplying the unity voltage reference value by the DC voltage trim value for each phase, and determination of the phase command signal as the difference between the voltage reference command value and the AC voltage trim value for each phase.

Further aspects of the disclosure provide a computer readable medium with computer-executable instructions for controlling an active power converter providing a regulated DC output by switching current from a multiphase voltage source to balance phase currents in the presence of unbalanced phase supply line voltages. The computer readable medium includes computer-executable instructions for measuring phase supply line voltage values of the input, determining d and q axis voltage command values in a synchronous reference frame based at least partially on the measured phase supply line voltages, converting the synchronous reference frame voltage command values to stationary phase voltage reference command values for each phase, determining DC voltage trim values for each phase at least partially according to the measured phase supply line voltages, determining a phase command signal based at least partially on the phase voltage reference command value and the DC voltage trim value for each phase, and controlling the active power converter at least partially according to the phase command signals.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the invention will be set forth in the following detailed description when considered in conjunction with the drawings, in which.

DETAILED DESCRIPTION OF THE INVENTION

Figure 1:
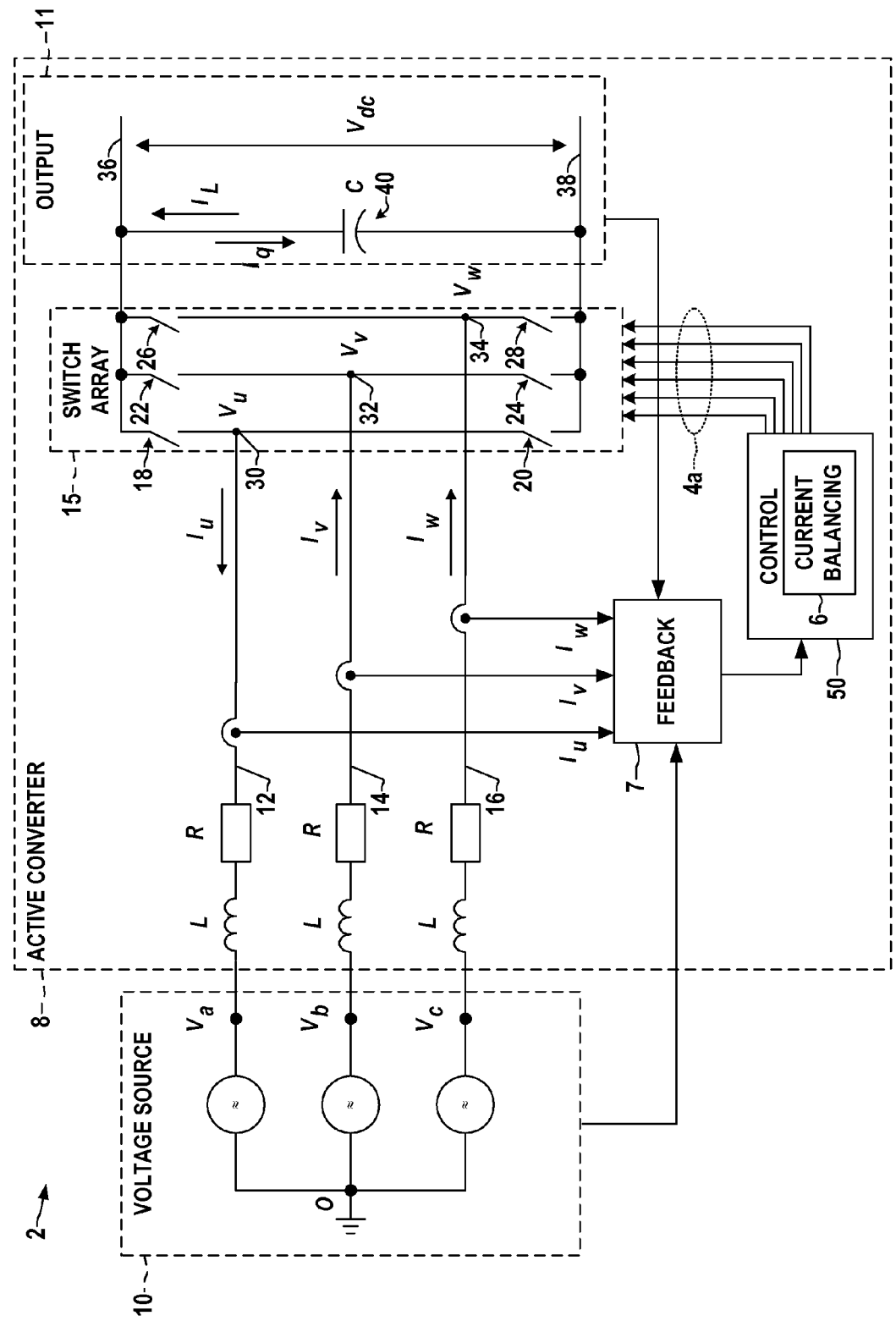
FIG. 1 is a simplified schematic diagram illustrating an exemplary active AC to DC power converter having a controller with phase current balancing control apparatus in accordance with one or more aspects of the present disclosure.

Referring now to the figures, several embodiments or implementations of the present invention are hereinafter described in conjunction with the drawings, wherein like reference numerals are used to refer to like elements throughout, and wherein the various features are not necessarily drawn to scale.

Referring initially to FIG. 1, an exemplary active power conversion system 2 is illustrated, including an active converter 8 receiving multiphase AC input power from a source 10 and providing DC output power to an output 11 by selective controlled actuation of an array of switching devices in a converter array 15 operated by a switching control system 50. In accordance with the present disclosure, the converter controller 50 includes a current balancing component 6 and provides switching control signals 4a to the converter 15 based at least in part on one or more signals or values from a feedback system 7. The system 2 is illustrated in the context of a three-phase input voltage supply 10, although any multiphase system is contemplated for converting input power of three or more phases to provide DC electrical power at the output 11 in a controlled fashion. The converter 8 may be used in any form or type of power conversion application, for example, as a first stage in a motor drive that has an inverter or other subsequent stage to convert the DC at the output 11 into AC power to drive a motor or other load. The exemplary system 2 in FIG. 1 includes a three phase AC power source 10 that provides phase voltages $V_a$, $V_b$, and $V_c$ on corresponding lines 12, 14, and 16 through input line inductors L and resistors R to three converter phase lines 30, 32, and 34. The switching converter 15 includes an array of six power switching devices 18, 12, 22, 24, 26 and 28 (e.g., IGBTs or other semiconductor switching devices) which are selectively operated via the switching control signals 4a to convert the three phase AC voltages to DC voltage $V_{dc}$ across positive and negative DC buses 36 and 38, respectively, by selectively coupling of the bus lines 36 and 38 to the converter phase nodes 30, 32, and 34. Converter switches 18, 20, 22, 24, 26 and 28 are connected in pairs in three circuit legs between the positive and negative DC bus lines 36 and 38, respectively, and a capacitor 40 is coupled between the bus lines 36 and 38.

In operation, the controller 50 provides the switching control signals 4a so as to generate the DC voltage $V_{dc}$ at a desired level, where the switching of the devices 18-28 determines the input phase voltages $V_u$, $V_v$ and $V_w$ at the converter nodes 30, 32 and 34, respectively. The exemplary converter 8 can generate DC output voltage levels $V_{dc}$ that exceed the peak input AC voltages from the source 10 due to boost conversion operation of the switches using the inductors L. The switching operation establishes voltage potentials across the inductances L and resistors R in lines 12, 14, and 16 thereby creating line currents $I_u$, $I_v$, and $I_w$ which establish a q-axis current $I_q$ to charge the capacitor 40, and an output load at the DC bus lines 36 and 38 (e.g., an inverter in a motor drive application) receives load current $I_L$. The controller 50 and the current balancing component 6 thereof may be any suitable hardware, software, firmware, logic, or combinations thereof that are adapted, programmed, or otherwise configured to implement the functions illustrated and described herein. The controller 50, and the current balancing component 6 thereof in certain implementations may be implemented, in whole or in part, as software components and may be implemented as a set of sub-components or objects including computer executable instructions and computer readable data executing on one or more hardware platforms such as one or more computers including one or more processors, data stores, memory, etc. The components 50 and 6 and sub components thereof may be executed on the same computer or in distributed fashion in two or more processing components that are operatively coupled with one another to provide the functionality and operation described herein. Except as otherwise noted herein, the converter 8 operates generally as shown and described in U.S. Pat. No. 7,355,865 to Royak et al., assigned to Rockwell Automation Technologies, Inc., the entirety of which is hereby incorporated by reference.

Figure 2:
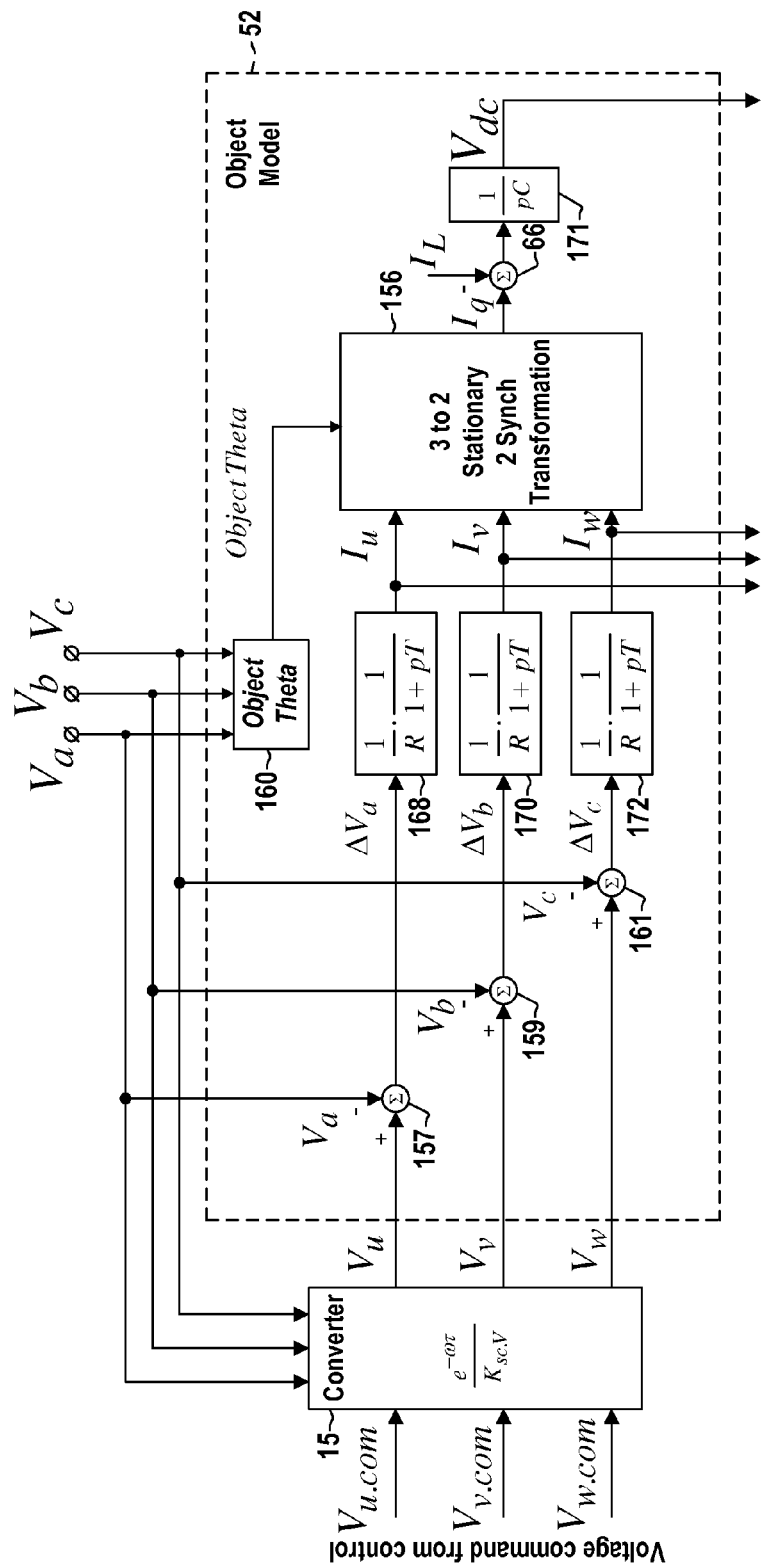
FIG. 2 is a schematic diagram illustrating an exemplary a three phase object model in the converter controller of FIG. 1.
Figure 3A:
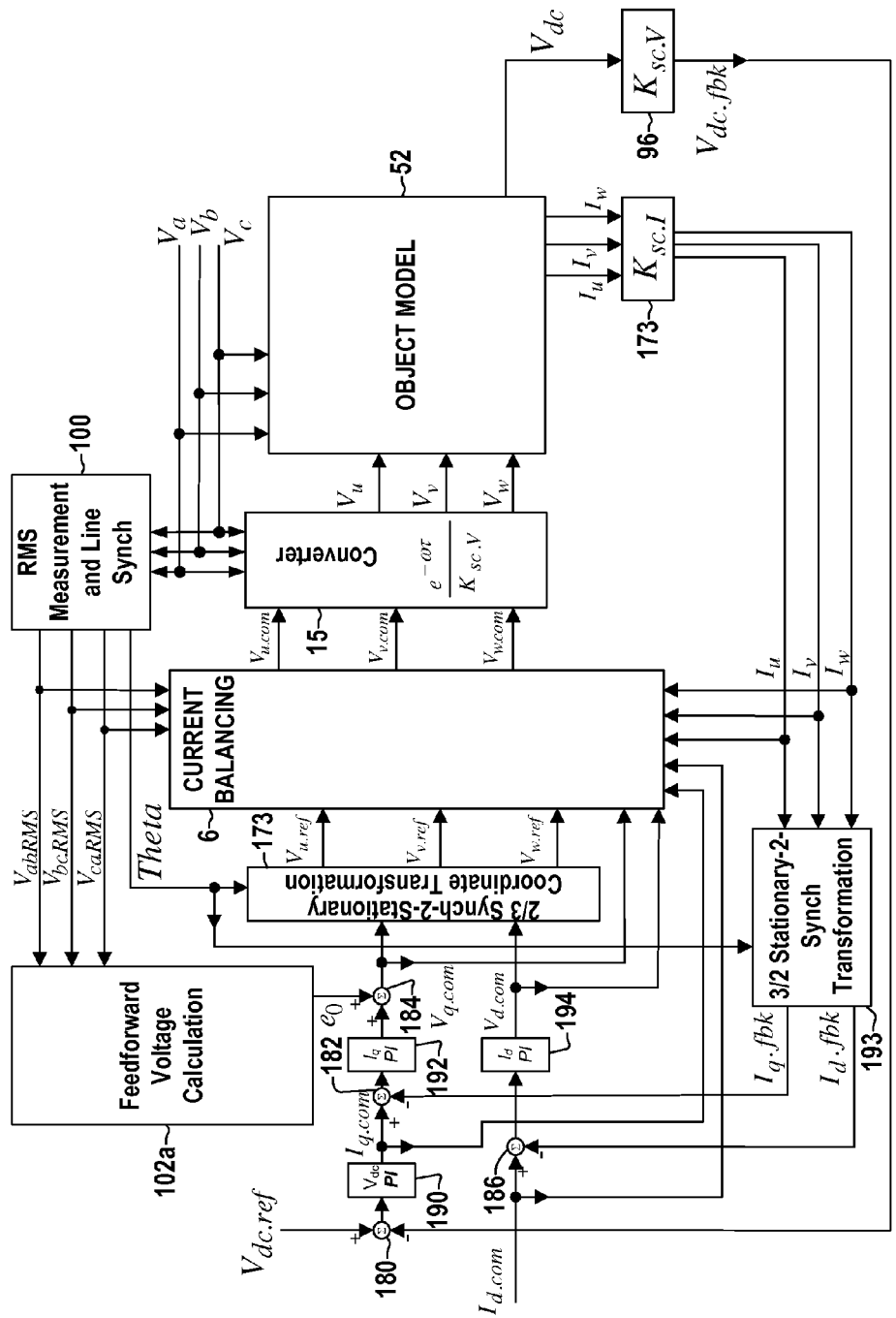
FIGS. 3A and 3B are schematic diagrams illustrating further details of the controller and phase current balancing features thereof in the active converter of FIGS. 1 and 2.
Figure 3B:
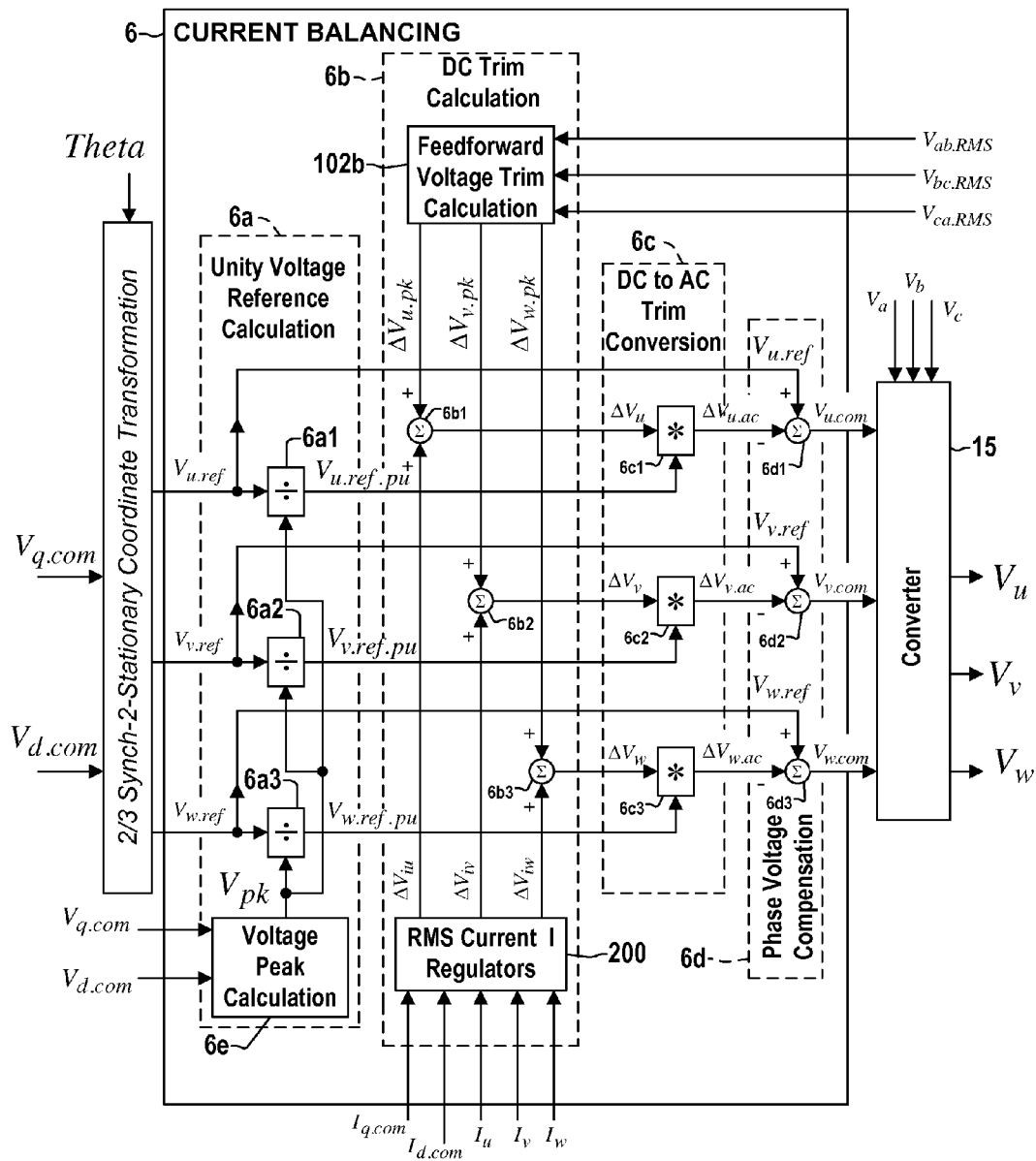

Referring also to FIGS. 2-5, in accordance with the present disclosure, the current balancing component 6 controls the converter 15 so as to balance phase currents $I_u$, $I_v$, and $I_w$ in the presence of unbalanced phase supply line voltages $V_a$, $V_b$, and $V_c$ by determining DC voltage trim values $\Delta V_{\phi.pk}$ ($\Delta V_{u.pk}$, $\Delta V_{v.pk}$, $\Delta V_{w.pk}$ as shown in FIG. 3B) for each phase at least partially according to the measured phase supply line voltages (e.g., measured RMS line to line voltages $V_{ab.RMS}$, $V_{bc.RMS}$, $V_{ca.RMS}$). The controller 50 operates the switching devices 18, 20, 22, 24, 26 and 28 according to phase command signals $V_{\phi.com}$ from the balancing component 6 based at least partially on a phase voltage reference command value $V_{\phi.ref}$ and the DC voltage trim value $\Delta V_{\phi.pk}$ for each phase.

The exemplary three-phase input line voltages $V_a$, $V_b$, and $V_c$ in FIG. 1 can be represented by the following equations (1):

$$V_a = V_{a.pk} \cdot \mathrm{Sin}(\omega t)$$

$$V_b = V_{b.pk} \cdot \mathrm{Sin}(\omega t - 120°) \text{ where } V_{a.pk}, V_{b.pk}, V_{c.pk} \text{ are phase voltagepeaks} \quad (1)$$

$$V_c = V_{c.pk} \cdot \mathrm{Sin}(\omega t + 120°)$$

If the voltage source 10 is balanced, then the corresponding peak values are also equal, as in the following equation (2):

$$V_{a.pk} = V_{b.pk} = V_{c.pk} = e_0 \text{ where } e_0 \text{ is the phase voltage-peak for a balanced AC line voltagesource} \quad (2).$$

From FIG. 1 and equations (1) and (2), the following equations (3)-(6) result:

$$V_u - V_a = I_u R \cdot (1 + Tp) \text{ or } I_u = (V_u - V_a) \cdot \frac{1}{R} \cdot \frac{1}{1 + Tp} \quad (3)$$

$$V_v - V_b = I_v R \cdot (1 + Tp) \text{ or } I_v = (V_v - V_b) \cdot \frac{1}{R} \cdot \frac{1}{1 + Tp} \quad (4)$$

$$V_w - V_c = I_u R \cdot (1 + Tp) \text{ or } I_w = (V_w - V_c) \cdot \frac{1}{R} \cdot \frac{1}{1 + Tp} \quad (5)$$

$$V_{dc} = \frac{1}{C} \cdot \int (I_q - I_L) \cdot dt \text{ or } V_{dc} = (I_q - I_L) \cdot \frac{1}{pC} \quad (6)$$

where: p=d/t is a differential operator, T=L/R is a time constant, $I_q$ is the q-axis (active) output component of the converter current, and $I_L$ is a load current.

As shown in FIG. 2, the exemplary active converter control system 50 employs a three-phase object model 52 based on the above equations (3-6). The object model 52 includes summers (Σ) 157, 159, 161 and 66, an angle determiner 160, four scalar modules 168, 170, 172 and 171 and a three phase stationary to two phase synchronous transformer 156. The summer 157 subtracts the line voltage value $V_a$ from node voltage value $V_u$ and provides its output to module 168. Similarly, summer 159 subtracts the line voltage value $V_b$ from node voltage value $V_v$ and provides its output to module 170 while summer 161 subtracts line voltage value $V_c$ from node voltage value $V_w$ and provides its output to module 172. The outputs of the summers 157, 159, and 161 are a set of three phase difference voltage values $\Delta V_a$, $\Delta V_b$ and $\Delta V_c$, respectively, which represent the potentials across the inductive and resistive values in lines 12, 14, and 16 of FIG. 1. The modules 168, 170 and 172 multiply the received difference values $\Delta V_\phi$ by a scalar consistent with equations 4-6 to generate values corresponding to three phase line currents $I_u$, $I_v$, and $I_w$, respectively. Current values $I_u$, $I_v$, and $I_w$ are provided to a coordinate transformer 156 which transforms those three phase stationary values into a synchronous values $I_q$ (and also a d-axis current value $I_d$, not shown). The q-axis current value $I_q$ is provided to the summer 166, which subtracts the load current $I_L$ from $I_q$ and provides the difference output to scalar module 171 to divide the value by the derivative of the value of capacitor 40 (FIG. 1) thereby providing a DC bus voltage value $V_{dc}$.

The relationships of the above equations (3-5) can be converted from a stationary frame (u,v,w or a,b,c) to a synchronous frame (d,q) based on the following equations (7-10):

$$\alpha = a \quad (7)$$

$$\beta = \frac{1}{\sqrt{3}} a + \frac{2}{\sqrt{3}} c \quad (8)$$

$$d = \alpha \cdot \mathrm{Cos}(\omega t) - \beta \cdot \mathrm{Sin}(\omega t) \quad (9)$$

$$q = \alpha \cdot \mathrm{Sin}(\omega t) + \beta \cdot \mathrm{Cos}(\omega t) \quad (10)$$

These equations (3-5) can also be converted to a 2-phase system α,β according to the following equations (11) and (12):

$$V_\alpha = I_\alpha R \cdot (1 + Tp) + e_0 \cdot \mathrm{Sin}(\omega t) \quad (11)$$

$$V_\beta = I_\beta R \cdot (1 + Tp) + e_0 \cdot \mathrm{Cos}(\omega t) \quad (12)$$

These can then be converted to a synchronous d, frame:

$$V_d = I_d R \cdot (1 + Tp) \text{ or } I_d = V_d \cdot \frac{1}{R} \cdot \frac{1}{1 + Tp} \quad (13)$$

$$V_q = I_q R \cdot (1 + Tp) + e_0 \text{ or } I_q = (V_q - e_0) \cdot \frac{1}{R} \cdot \frac{1}{1 + Tp} \quad (14)$$

The controller 50 generally controls the DC output according to the above equations (6) and (13-14) using the model 52, with further modification of the control scheme to balance the phase currents using the balancing component 6 per the various aspects of the present disclosure. The block diagram of the exemplary phase balancing control scheme is shown in FIGS. 3A and 3B for the exemplary three-phase object model 52, including d-axis and a q-axis component current loops, as well as a feed forward term for the q-current loop that is equal to the peak of the phase voltage $e_0$ (FIG. 3A). If the AC line voltage source 10 is balanced, then all three converter leg currents $I_u$, $I_v$, and $I_w$ are identical and the DC bus voltage $V_{dc}$ has nominal ripple.

For unbalanced supply voltages $V_a$, $V_b$, and $V_c$, however, the following equation (15) holds:

$$V_{a.pk} \neq V_{b.pk} \neq V_{c.pk} \neq e_0 \quad (15),$$

and the three converter leg currents $I_u$, $I_v$ and $I_w$ are not identical. In operation, absent countermeasures according to the present disclosure, this unbalance in the phase currents can prevent full utilization of the load-driving capabilities of the converter 8.

As seen in FIG. 2, the converter phase currents $I_u$, $I_v$ and $I_w$ ($I_\phi$) are generated as the result of the voltage differences $\Delta V_a$, $\Delta V_b$, and $\Delta V_c$ ($\Delta V_\phi$) as provided in the following equations (16)-(18):

$$\Delta V_a = (V_u - V_a) \quad (16)$$

$$\Delta V_b = (V_v - V_b) \quad (17)$$

$$\Delta V_c = (V_w - V_c) \quad (18)$$

If the voltage source 10 is balanced, the phase peaks are equal:

$$V_{a.pk} = V_{b.pk} = V_{c.pk} \quad (19),$$

and the phase peaks of the converter output voltage are equal as a result of the 2 to 3 conversion rule in the following equation (20):

$$(V_{u.pk} = V_{v.pk} = V_{w.pk} = \sqrt{V_d^2 + V_q^2}) \quad (20).$$

As a result, the voltage differences from each converter leg are equal ($\Delta V_a = \Delta V_b = \Delta V_c$) in the case of a balanced input 10. In this case the phase currents $I_\phi$ in the converter legs 12, 14, and 16 should be equal since the impedances L and R are the same for each phase.

The inventors have appreciated, however, that when the voltage source 10 is unbalanced, the phase voltage peak values $V_{\phi.pk}$ are not equal ($\Delta V_a \neq \Delta V_b \neq \Delta V_c$), while the converter output voltage phase peaks are equal, due to the 2 to 3 conversion rule in equation (20). As a result, the converter leg currents $I_u$, $I_v$ and $I_w$ will not be equal due to the voltage imbalance of the input source 10. Referring in particular to FIGS. 3A and 3B, the present disclosure advantageously provides for determination of a voltage trim $\Delta V_{\phi.ac}$ for adjustment of each phase voltage command, where the trim is an AC voltage in phase with the proper voltage reference $V_{\phi.ref}$ that is the output of a 2 to 3 coordinate transformation. As best shown in FIG. 3B, the current balancing component 6 of the controller 50 adjusts the voltage references $V_{\phi.ref}$ based at least in part on the trim values $\Delta V_{\phi.ac}$ so as to counteract the effects of input voltage imbalance, thereby providing for balanced converter phase currents $I_u$, $I_v$, and $I_w$ even in the presence of unbalanced phase supply line voltages $V_a$, $V_b$, and $V_c$.

The overall architecture of the controller 50 is depicted in FIG. 3A, where the controller 50 receives a DC bus voltage reference value $V_{dc.ref}$ as a setpoint to which the output voltage $V_{dc}$ is controlled in closed loop fashion. The converter 15 (including the array of switching devices shown in FIG. 1) receives three phase supply line voltages $V_a$, $V_b$ and $V_c$ and the converter 15 is controlled in a manner consistent with command voltage values $V_{u.com}$, $V_{v.com}$ and $V_{w.com}$ provided by the current balancing component 6 so as to cause the DC bus voltage $V_{dc}$ at the output 11 to track the reference voltage $V_{dcref}$. As shown in FIG. 3A, each of the three phase line current values $I_u$, $I_v$, and $I_w$ are stepped up by a gain module 173, the stepped up values being provided as three phase feedback currents I $I_u$, $I_v$, and $I_w$ to the current balancing component 6 of the controller 50 a scalar $K_{sc.I}$. Moreover, the bus voltage value $V_{dc}$ is fed back from the model 52 via a gain block 96 that steps up the bus value $V_{dc}$ by a scalar $K_{sc.v}$. The controller 50 also includes summers 180, 182, 184, and 186, as well as proportional-integral (PI) regulators 190, 192, and 194, two signal transformers 173 and 193, a line-to-line RMS measurement module 100, and a feed forward voltage calculator 102a.

Figure 4:
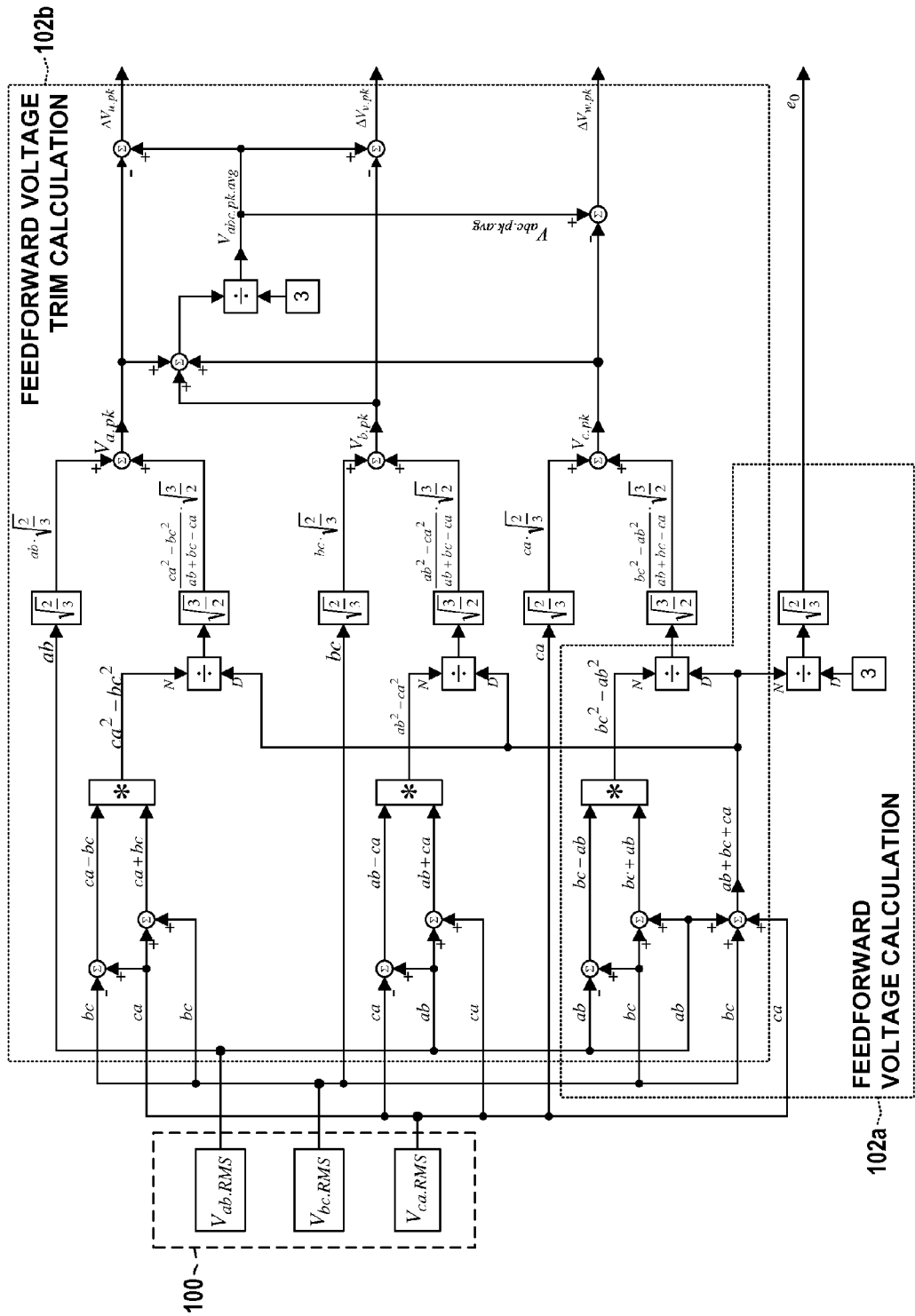
FIG. 4 is a schematic diagram illustrating feedforward computation components of the controller of FIGS. 1-3.

The RMS measurement component 100 receives the line voltage values $V_a$, $V_b$, and $V_c$ and provides line-to-line RMS voltage output values $V_{ab.RMS}$, $V_{bc.RMS}$, and $V_{ca.RMS}$, as well as an angle value theta, with further details of the feedforward component 102a being illustrated in FIG. 4. The summer 180 subtracts the DC feedback voltage value $V_{dcfbk}$ from the DC reference voltage value $V_{dc.ref}$ and provides an output to PI regulator 190, which steps up the value and provides its output as a q-axis command current $I_{q.com}$ to summer 182. The feedback current values $I_v$, $I_u$, and $I_w$ are provided to the three-to-two phase transformer 193 which generates a d-axis feedback current value $I_{dfbk}$ and a q-axis feedback value $I_{qfbk}$. The summer 186 subtracts the d-axis feedback current from a d-axis reference command value current $I_{d.com}$ and provides the difference to PI regulator 194, which steps up the value received from summer 186 and provides its output as a d-axis voltage command value $V_{d.com}$ to a 2/3 synchronous to stationary coordinate transformation component (transformer) 173 and also to the current balancing component 6 (FIG. 3B). Summer 182 subtracts the q-axis feedback value $I_{qfbk}$ from the q-axis command current $I_{q.com}$ and provides this difference as an output to the PI regulator 192. The output of regulator 192 is provided to summer 184 which adds the value of $e_0$ from the feedforward component 102a and provides its output $V_{q.com}$ to the transformer 173 and also to the balancing component 6. The transformer 173 also receives the theta input from the RMS measurement component 100 and transforms the d and q-axis command voltage values $V_{d.com}$ and $V_{q.com}$ to three phase stationary reference voltage values $V_{u.ref}$, $V_{v.ref}$ and $V_{w.ref}$ which are provided as phase voltage reference command value inputs to the current balancing component 6.

Figure 5:
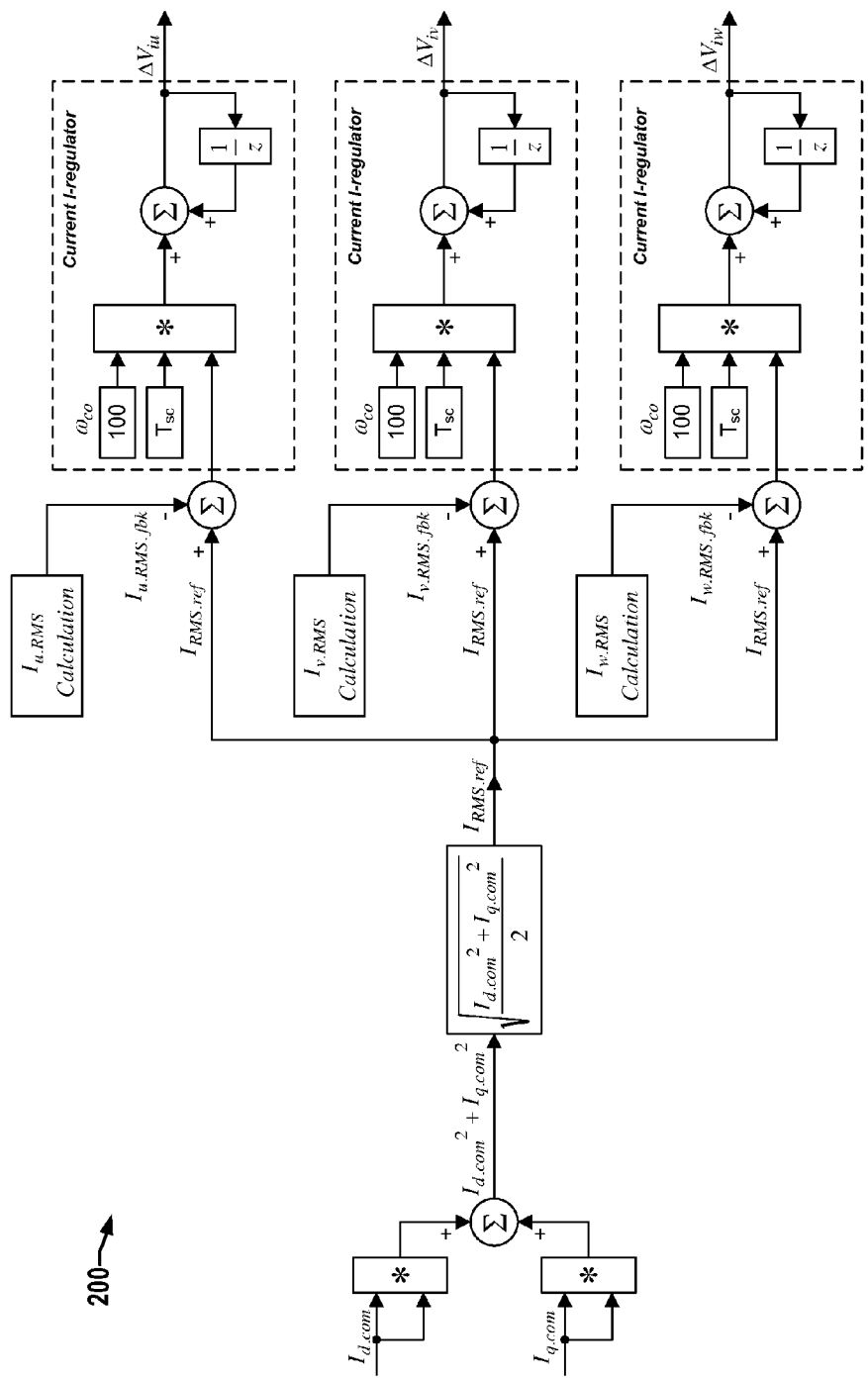
FIG. 5 is a schematic diagram illustrating exemplary RMS current regulators in the controller of FIGS. 1-4.

As illustrated in FIG. 3B, the current balancing component 6 is operative to control the switches of the converter 15 to balance the phase currents $I_u$, $I_v$, and $I_w$ in the presence of unbalanced phase supply line voltages $V_a$, $V_b$, and $V_c$ by determining DC voltage trim values $\Delta V_{\phi.pk}$ for each phase via component 6e at least partially according to the measured phase supply line voltages (e.g., the measured RMS line-to-line voltage values $V_{ab.RMS}$, $V_{bc.RMS}$, and $V_{ca.RMS}$). The balancing component 6 generates phase command signals $V_{u.com}$, $V_{v.com}$, and $V_{w.com}$ based at least partially on a phase voltage reference command value $V_{\phi.ref}$ and the DC voltage trim value $\Delta V_{\phi.pk}$ for each phase. In the illustrated embodiment of FIG. 3B, the component 6 is comprised of a unity voltage reference calculation component 6a, a DC trim calculation component 6b including a feedforward voltage trim calculation component 102b (FIG. 4 below) and an RMS current regulator component 200 (FIG. 5 below). The balancing component 6 further comprises a DC to AC trim conversion component 6c and a phase voltage compensation component 6d.

In operation, the control system 50 (FIGS. 3A and 3B) determines d and q axis voltage command values $V_{d.com}$, $V_{q.com}$ in a stationary reference frame based at least partially on phase currents and measured phase supply line voltages $V_{ab.RMS}$, $V_{bc.RMS}$, and $V_{ca.RMS}$ and converts these synchronous reference frame voltage command values $V_{d.com}$, $V_{q.com}$ to phase voltage reference command values $V_{\phi.ref}$ for each phase. The unity voltage reference component 6a of the current balancing component 6 is adapted to determine a peak voltage value $V_{pk}$ in a stationary reference frame based at least partially on synchronous reference frame voltage command values $V_{d.com}$, $V_{q.com}$ and also operates to determine unity voltage reference values $V_{\phi.ref.pu}$ as a ratio of the phase voltage reference command value $V_{\phi.ref}$ to the peak voltage value $V_{pk}$ for each phase via divider components 6a1, 6a2, and 6a3. The unity voltage reference calculation component 6a thus provides the unity phase voltage reference signals $V_{\phi.ref.pu}$ that are then used to create a voltage trim in phase with the voltage references $V_{\phi.ref}$. The voltage peak calculation component 6e receives the d and q-axis command values $V_{d.com}$ and $V_{q.com}$ and calculates the peak voltage value $V_{pk}$ per the following equation (24):

$$V_{pk} = \sqrt{V_{q.com}^2 + V_{d.com}^2} \quad (24)$$

The peak voltage value $V_{pk}$ is then used by the unity voltage reference component 6a (via dividers 6a1-6a3) to determine the unity voltage reference values $V_{\phi.ref.pu}$ as a ratio of the phase voltage reference command value $V_{\phi.ref}$ to the peak voltage value $V_{pk}$ for each phase per the following equations (21)-(23):

$$V_{u.ref.pu} = \frac{V_{u.ref}}{\sqrt{V_{q.com}^2 + V_{d.com}^2}} \quad (21)$$

$$V_{v.ref.pu} = \frac{V_{v.ref}}{\sqrt{V_{q.com}^2 + V_{d.com}^2}} \quad (22)$$

$$V_{w.ref.pu} = \frac{V_{w.ref}}{\sqrt{V_{q.com}^2 + V_{d.com}^2}} \quad (23)$$

As shown in FIGS. 3B and 4, the feedforward voltage trim calculation component 102b of the DC trim component 6b receives the line to line RMS voltage measurement values $V_{ab.RMS}$, $V_{bc.RMS}$, and $V_{ca.RMS}$ from measurement component 100 and uses these to determine a peak average $V_{abc.avg}$ of the phase supply line voltages and to determine a DC voltage trim value $\Delta V_{\phi.pk}$ as the difference between the peak average of all the phase supply line voltages $V_{abc.avg}$ and the peak value of the individual phase supply line voltage $V_{\phi.pk}$ for each phase. In the illustrated embodiment, moreover, the feedforward voltage trim calculation component 102b is further operative to convert measured RMS line-to-line voltages $V_{LL.RMS}$ to phase AC peak voltages $V_{\phi.pk}$ as shown in FIG. 4. The trim conversion component 6c operates to convert the DC voltage trim values $\Delta V_{\phi.pk}$ to AC voltage trim values $\Delta V_{\phi.ac}$ by multiplying the unity voltage reference value $V_{\phi.ref.pu}$ by the DC voltage trim value $\Delta V_{\phi.pk}$ for each phase. In the illustrated example, moreover, the DC trim component 6b is further operative to adjust the DC voltage trim value $\Delta V_{\phi.pk}$ based at least partially on an RMS current error value $\Delta V_{i\phi}$ to derive an adjusted DC voltage trim value $\Delta V_{\phi}$ for each phase via summers 6b1-6b3, and the trim conversion component 6c is operative to multiply the unity voltage reference value $V_{\phi.ref.pu}$ by the adjusted DC voltage trim value $\Delta V_{\phi}$ via multiplier components 6c1-6c3 in order to determine the AC voltage trim values $\Delta V_{\phi.ac}$ for each phase. The phase voltage compensation component 6d then determines the phase command signals $V_{\phi.com}$ for each phase as the difference between the voltage reference value $V_{\phi.ref}$ and the AC voltage trim value $\Delta V_{\phi.ac}$. The controller 50 then operates the active power converter 15 at least partially according to the phase command signals $V_{\phi.com}$.

The DC trim calculation component 6b calculates the feedforward DC voltage trim values via component 102b as the difference between the peak average of all three voltage source phases and the peak value of each individual phase according to the following equations (25)-(27):

$$\Delta V_{u.pk} = V_{abc.avg} - V_{a.pk} \quad (25)$$

$$\Delta V_{v.pk} = V_{abc.avg} - V_{b.pk} \quad (26)$$

$$\Delta V_{w.pk} = V_{abc.avg} - V_{c.pk} \quad (27)$$

The above equations (25-27) involve the phase peak voltage for each individual phase of an unbalanced AC line voltage source. In the exemplary system 8, however, only the RMS line-to-line voltages are measured. Accordingly, the component 102b converts the measured RMS voltages to phase AC voltages. Three phase voltages can be represented according to the above equation (1), and the line-to-line $V_{ab}$ voltage can be calculated according to the following equation (28):

$$\begin{aligned} V_{ab} &= V_a - V_b \quad (28) \\ &= V_{a.pk} \cdot \mathrm{Sin}(\omega t) - V_{b.pk} \cdot \mathrm{Sin}(\omega t - 120^0) \\ &= V_{a.pk} \cdot \mathrm{Sin}(\omega t) - [V_{b.pk} \cdot \mathrm{Sin}(\omega t) \cdot \mathrm{Cos}(120^0) - \\ &\quad V_{b.pk} \cdot \mathrm{Cos}(\omega t) \cdot \mathrm{Sin}(120^0)] = \\ &= \left( V_{a.pk} + \frac{V_{b.pk}}{2} \right) \cdot \mathrm{Sin}(\omega t) + \frac{\sqrt{3}}{2} \cdot V_{b.pk} \cdot \mathrm{Cos}(\omega t) \\ &= \sqrt{V_{a.pk}^2 + V_{a.pk} \cdot V_{b.pk} + V_{b.pk}^2} \cdot \\ &\quad \mathrm{Sin}\left[ \omega t + \mathrm{arctg}\left( \frac{\sqrt{3} \cdot V_{b.pk}}{2 \cdot V_{a.pk} + V_{b.pk}} \right) \right] \end{aligned}$$

In the case where the voltage input is balanced:

$$V_{a.pk} = V_{b.pk} = V_{c.pk} \text{ and } V_{ab} = \sqrt{3} \cdot V_{a.pk} \cdot \mathrm{Sin}(\omega t + 30^0),$$

and The RMS_ab voltage is equal to:

$$V_{ab\_RMS} = \frac{\sqrt{V_{a.pk}^2 + V_{a.pk} \cdot V_{b.pk} + V_{b.pk}^2}}{\sqrt{2}} \quad (29)$$

The line-to-line $V_{bc}$ voltage can be calculated according to the following equation (30) as:

$$\begin{aligned} V_{bc} &= V_b - V_c \quad (30) \\ &= V_{b.pk} \cdot \mathrm{Sin}(\omega t - 120^0) - V_{c.pk} \cdot \mathrm{Sin}(\omega t + 120^0) = \\ &= -\frac{1}{2} \cdot (V_{b.pk} - V_{c.pk}) \cdot \mathrm{Sin}(\omega t) - \frac{\sqrt{3}}{2} \cdot \\ &\quad (V_{b.pk} + V_{c.pk}) \cdot \mathrm{Cos}(\omega t) \\ &= \sqrt{V_{b.pk}^2 + V_{b.pk} \cdot V_{c.pk} + V_{c.pk}^2} \cdot \end{aligned}$$

-continued $$\text{Sin}\left[\omega t + \text{arctg}\left(\frac{\sqrt{3} \cdot (V_{b.pk} + V_{c.pk})}{V_{b.pk} - V_{c.pk}}\right)\right]$$

Thus, if the AC line voltage source 10 is balanced, then:

$$V_{a.pk} = V_{b.pk} = V_{c.pk} \text{ and } V_{bc} = \sqrt{3} \cdot V_{a.pk} \cdot \text{Sin}(\omega t - 90^\circ),$$

and the RMS_bc voltage is equal to:

$$V_{bc\_RMS} = \frac{\sqrt{V_{b.pk}^2 + V_{b.pk} \cdot V_{c.pk} + V_{c.pk}^2}}{\sqrt{2}} \quad (31)$$

The line-to-line $V_{ca}$ voltage can be calculated as:

$$V_{ca} = V_c - V_a \quad (32)$$
$$= V_{c.pk} \cdot \text{Sin}(\omega t + 120^\circ) - V_{a.pk} \cdot \text{Sin}(\omega t) =$$
$$= V_{c.pk} \cdot \text{Sin}(\omega t) \cdot \text{Cos}(120^\circ) + V_{c.pk} \cdot \text{Cos}(\omega t) \cdot$$
$$\text{Sin}(120^\circ) - V_{a.pk} \cdot \text{Sin}(\omega t) =$$
$$= -\left(V_{a.pk} + \frac{V_{c.pk}}{2}\right) \cdot \text{Sin}(\omega t) + \frac{\sqrt{3}}{2} \cdot V_{c.pk} \cdot \text{Cos}(\omega t)$$
$$= \sqrt{V_{a.pk}^2 + V_{a.pk} \cdot V_{c.pk} + V_{c.pk}^2} \cdot$$
$$\text{Sin}\left[\omega t - \text{arctg}\left(\frac{\sqrt{3} \cdot V_{c.pk}}{2 \cdot V_{a.pk} + V_{c.pk}}\right)\right]$$

If the AC line voltage source is balanced then:

$$V_{a.pk} = V_{b.pk} = V_{c.pk} \text{ and } V_{ca} = -\sqrt{3} \cdot a \cdot \text{Sin}(\omega t - 30^\circ)$$

The RMS_ca voltage is equal to:

$$V_{ca\_RMS} = \frac{\sqrt{V_{a.pk}^2 + V_{a.pk} \cdot V_{c.pk} + V_{c.pk}^2}}{\sqrt{2}} \quad (33)$$

In order to determine the actual phase voltage peak values $V_{a.pk}$, $V_{b.pk}$, $V_{c.pk}$ as a function of the measured RMS line-to-line voltage values, the following equations (34)-(36) provide (based on equations 29, 31, and 33):

$$V_{a.pk}^2 + V_{a.pk} \cdot V_{b.pk} + V_{b.pk}^2 = 2 \cdot V_{ab\_RMS}^2 \quad (34)$$

$$V_{b.pk}^2 + V_{b.pk} \cdot V_{c.pk} + V_{c.pk}^2 = 2 \cdot V_{bc\_RMS}^2 \quad (35),$$

$$V_{c.pk}^2 + V_{c.pk} \cdot V_{a.pk} + V_{a.pk}^2 = 2 \cdot V_{ca\_RMS}^2 \quad (36)$$

and it is assumed that:

$$V_{a.pk} + V_{b.pk} + V_{c.pk} = \frac{\sqrt{2} \cdot (V_{ab\_RMS} + V_{bc\_RMS} + V_{ca\_RMS})}{\sqrt{3}} \quad (37)$$

to indicate the relationship between the phase peak and the line-to-line RMS voltages with balanced and unbalanced voltage sources.

Solving the equations (34-37) together and subtracting equation (35) from (36) yields the following equation (38):

$$V_{c.pk}^2 + V_{c.pk} \cdot V_{a.pk} + V_{a.pk}^2 - V_{b.pk}^2 - V_{b.pk} \cdot V_{c.pk} - V_{c.pk}^2 = 2 \cdot V_{ca\_RMS}^2 - 2 \cdot V_{bc\_RMS}^2$$

or $$(V_{a.pk} - V_{b.pk}) \cdot (V_{a.pk} + V_{b.pk} + V_{c.pk}) = 2 \cdot V_{ca\_RMS}^2 - 2 \cdot V_{bc\_RMS}^2 \quad (38)$$

Taking equation (37) into account:

$$V_{a.pk} - V_{b.pk} = \frac{\sqrt{6} \cdot (V_{ca\_RMS}^2 - V_{bc\_RMS}^2)}{V_{ab\_RMS} + V_{bc\_RMS} + V_{ca\_RMS}} = X_1 \quad (39)$$

Subtracting equation (36) from (34) and making the same manipulation:

$$V_{b.pk} - V_{c.pk} = \frac{\sqrt{6} \cdot (V_{ab\_RMS}^2 - V_{ca\_RMS}^2)}{V_{ab\_RMS} + V_{bc\_RMS} + V_{ca\_RMS}} = X_2 \quad (40)$$

Subtracting equation (34) from (35) and making the same manipulation:

$$V_{c.pk} - V_{a.pk} = \frac{\sqrt{6} \cdot (V_{bc\_RMS}^2 - V_{ab\_RMS}^2)}{V_{ab\_RMS} + V_{bc\_RMS} + V_{ca\_RMS}} = X_3 \quad (41)$$

Solving equations (34) and (39) together yields):

$$V_{b.pk} = V_{a.pk} - X_1 \quad (42)$$

Substitute (42) into (34):

$$V_{a.pk}^2 + V_{a.pk} \cdot (V_{a.pk} - X_1) + (V_{a.pk} - X_1)^2 = 2 \cdot V_{ab\_RMS}^2 \quad (43)$$

After some manipulations:

$$V_{a.pk} = \frac{X_1}{2} + \sqrt{\frac{2}{3} \cdot V_{ab\_RMS}^2 - \frac{X_1^2}{12}}$$

If we will take into account:

$$X_1^2 \ll \frac{2}{3} \cdot V_{ab\_RMS}^2$$

then:

$$V_{a.pk} \approx \frac{X_1}{2} + \sqrt{\frac{2}{3}} \cdot V_{ab\_RMS} \quad (44)$$

Finally, substituting (39) into (44) we receive the peak value for phase "a":

$$V_{a.pk} = \sqrt{\frac{2}{3}} \cdot V_{ab\_RMS} + \sqrt{\frac{3}{2}} \cdot \frac{(V_{ca\_RMS}^2 - V_{bc\_RMS}^2)}{V_{ab\_RMS} + V_{bc\_RMS} + V_{ca\_RMS}} \quad (45)$$

Repeating this process for "b" and "c" we will receive:

$$V_{b.pk} = \sqrt{\frac{2}{3}} \cdot V_{bc\_RMS} + \sqrt{\frac{3}{2}} \cdot \frac{(V_{ab\_RMS}^2 - V_{ca\_RMS}^2)}{V_{ab\_RMS} + V_{bc\_RMS} + V_{ca\_RMS}} \quad (46)$$

$$V_{c.pk} = \sqrt{\frac{2}{3}} \cdot V_{ca\_RMS} + \sqrt{\frac{3}{2}} \cdot \frac{(V_{bc\_RMS}^2 - V_{ab\_RMS}^2)}{V_{ab\_RMS} + V_{bc\_RMS} + V_{ca\_RMS}} \quad (47)$$

As a result, the phase peak average of all three voltage source phases is then given by the following equation (48):

$$V_{abc.pk.avg} = \frac{V_{a.pk} + V_{b.pk} + V_{c.pk}}{3} \quad (48)$$

Referring also to FIG. 5, the voltage trim feed forward calculation component 200 determines the RMS current reference according to the following equation (49):

$$I_{RMS.ref} = \sqrt{I_{q.com}^2 + I_{d.com}^2} \quad (49),$$

and the final DC voltage trim values are determined by the DC trim calculation component 6b (FIG. 3B) based at least partially on the RMS current error value $\Delta V_{i\phi}$ per the following equations (50)-(52):

$$\Delta V_u = \Delta V_{u.pk} + \Delta V_{iu} \quad (50)$$

$$\Delta V_v = \Delta V_{v.pk} + \Delta V_{iv} \quad (51)$$

$$\Delta V_w = \Delta V_{w.pk} + \Delta V_{iw} \quad (52).$$

As shown in FIG. 3B, the DC to AC Voltage Trim Conversion component 6d converts the DC voltage trim to an AC value by multiplying the unity voltage reference value $V_{\phi.ref.pu}$ by the adjusted DC voltage trim value $\Delta V_\phi$ according to the following equations (53)-(55):

$$\Delta V_{u.ac} = V_{u.ref.pu} * \Delta V_u \quad (53)$$

$$\Delta V_{v.ac} = V_{v.ref.pu} * \Delta V_v \quad (54)$$

$$\Delta V_{w.ac} = V_{w.ref.pu} * \Delta V_w \quad (55)$$

The phase voltage compensation component 6d determines the final phase command signals $V_{\phi.com}$ according to the following equations (56)-(58):

$$V_{u.com} = V_{u.ref} - \Delta V_{u.ac} \quad (56)$$

$$V_{v.com} = V_{v.ref} - \Delta V_{v.ac} \quad (57)$$

$$V_{w.com} = V_{w.ref} - \Delta V_{w.ac} \quad (58)$$

As best seen in FIG. 3B, the phase voltage reference command values $V_{\phi.ref}$ are AC (generally sinusoidal) values that are equal even if the voltage source 10 is unbalanced, whereas the DC voltage trim values $\Delta V_{\phi.pk}$ for each phase are DC values that are generally different from one another if the source 10 has unbalanced voltages. The DC to Ac trim conversion component 6c thus multiplies the AC sinusoidal per unit reference values $V_{\phi.ref.pu}$ by a DC trim value computed according to the imbalance magnitude, so as to provide the correct compensation, in phase, to adjust the control command sent to the converter 15 in order to rebalance the phase currents $I_u$, $I_v$, and $I_w$ to counteract the imbalance in the input source voltages $V_a$, $V_b$, and $V_c$.

Figure 6:
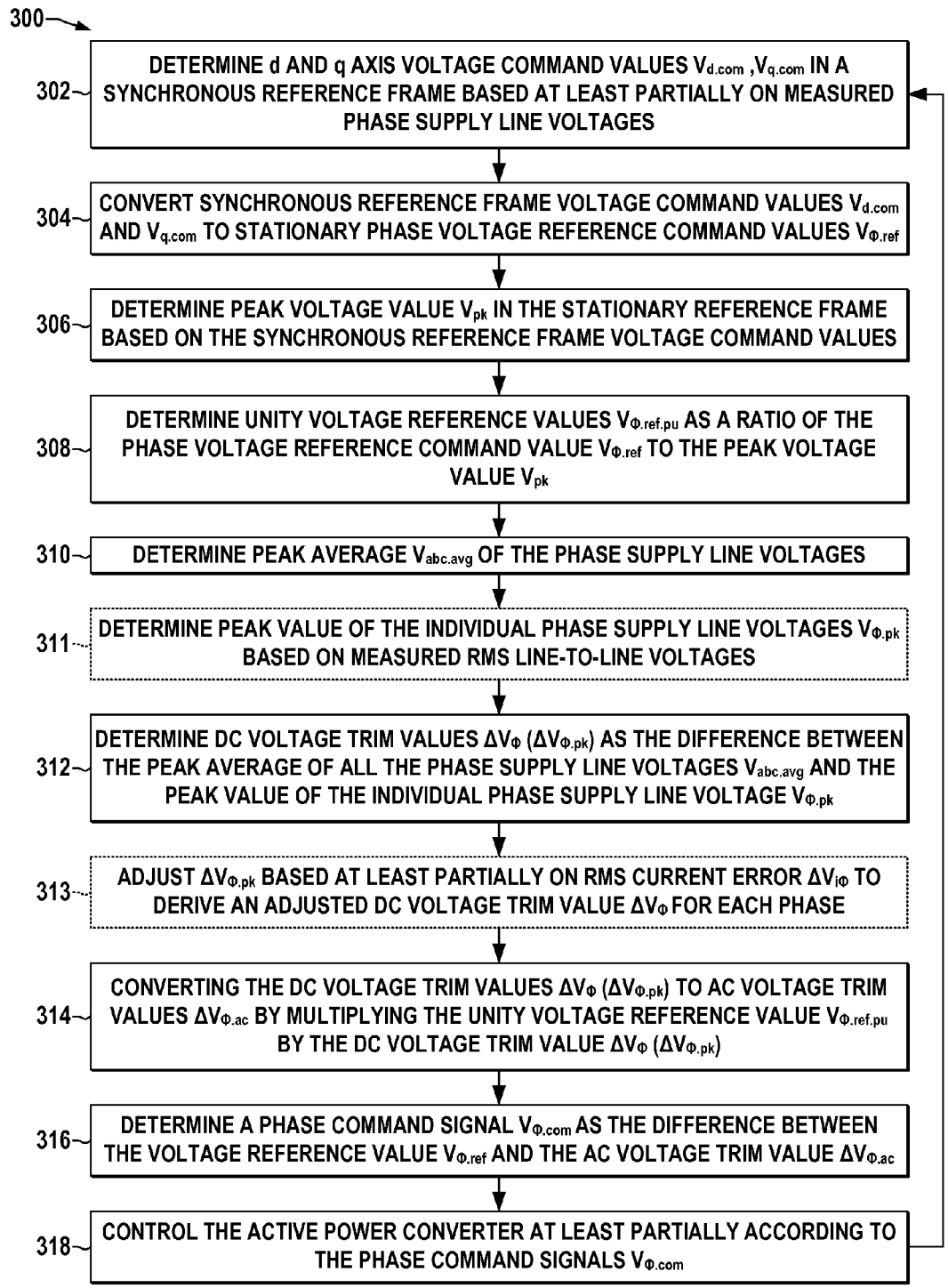
FIG. 6 is a flow diagram illustrating an exemplary active converter control method in accordance with other aspects of the present disclosure.

Referring now to FIG. 6, further aspects of the disclosure provide a method for controlling an active power converter, wherein FIG. 6 illustrates one such method 300. While the method 300 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 300 other methods of the disclosure may be implemented in hardware, software, or combinations thereof, such as in the exemplary control system 50 described above, and may be embodied in the form of computer executable instructions stored in a computer readable medium, such as in a memory operatively associated with the control system 50 in one example.

The method 300 includes determining d and q axis voltage command values $V_{d.com}$, $V_{q.com}$ in a synchronous reference frame at 302 based at least partially on the measured phase supply line voltages $V_{ab.RMS}$, $V_{bc.RMS}$, $V_{ca.RMS}$. The synchronous reference frame voltage command values $V_{d.com}$, $V_{q.com}$ are converted at 304 to phase voltage reference command values $V_{\phi.ref}$ for each phase, and a peak voltage value $V_{pk}$ is determined at 306 in the synchronous reference frame based at least partially on the synchronous reference frame voltage command values $V_{d.com}$, $V_{q.com}$. The method 300 further includes determining unity voltage reference values $V_{\phi.ref.pu}$ at 308 as a ratio of the phase voltage reference command value $V_{\phi.ref}$ to the peak voltage value $V_{pk}$ for each phase, and determining a peak average $V_{abc.avg}$ of the phase supply line voltages at 310. The method 300 may optionally include determining DC voltage trim values $\Delta V_{\phi.pk}$ at 311 for each phase at least partially according to the measured phase supply line voltages $V_{ab.RMS}$, $V_{bc.RMS}$, $V_{ca.RMS}$, and includes determining the DC voltage trim value $\Delta V_{\phi.pk}$ at 312 as the difference between the peak average of all the phase supply line voltages $V_{abc.avg}$ and the peak value of the individual phase supply line voltage $V_{\phi.pk}$ for each phase. In certain embodiments, the method 300 may include adjusting the DC voltage trim value $\Delta V_{\phi.pk}$ at 313 based at least partially on an RMS current error value $\Delta V_{i\phi}$ to derive an adjusted DC voltage trim value $\Delta V_\phi$ for each phase. AC voltage trim values $\Delta V_{\phi.ac}$ are then determined by converting the DC voltage trim values $\Delta V_{\phi.pk}$ at 314 to AC voltage trim values $\Delta V_{\phi.ac}$ by multiplying the unity voltage reference value $V_{\phi.ref.pu}$ by the DC voltage trim value $\Delta V_{\phi.pk}$ for each phase. At 316, a phase command signal $V_{\phi.com}$ is determined as the difference between the voltage reference command value $V_{\phi.ref}$ and the AC voltage trim value $\Delta V_{\phi.ac}$ for each phase, and the power converter is controlled at 318 at least partially according to the phase command signals $V_{\phi.com}$, where the converter may be controlled at least partially using a current loop in a synchronous reference frame.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, logic, or combinations thereof, which performs the specified function of the described component (i.e., that is functionally equivalent), even though not structurally equivalent to the disclosed structure which performs the function in the illustrated implementations of the invention. Moreover, the various control components may be implemented as computer-executable instructions for carrying out one or more of the above illustrated and described control operations, steps, tasks, where the instructions are included in a computer-readable medium. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A method for controlling an active power converter providing a regulated DC output by switching current from a multiphase voltage source to balance phase currents in the presence of unbalanced phase supply line voltages, the method comprising:
   measuring phase supply line voltage values of the input;
   determining d and q axis voltage command values in a synchronous reference frame based at least partially on the measured phase supply line voltages;
   converting the synchronous reference frame voltage command values to stationary phase voltage reference command values for each phase;
   determining DC voltage trim values for each phase at least partially according to the measured phase supply line voltages;
   determining a phase command signal based at least partially on the phase voltage reference command value and the DC voltage trim value for each phase; and
   controlling the active power converter at least partially according to the phase command signals.

2. The method of claim 1, comprising:
   determining a peak voltage value in the stationary reference frame based at least partially on the synchronous reference frame voltage command values;
   determining unity voltage reference values as a ratio of the phase voltage reference command value to the peak voltage value for each phase;
   determining a peak average of the phase supply line voltages;
   determining the DC voltage trim value as the difference between the peak average of all the phase supply line voltages and the peak value of the individual phase supply line voltage for each phase, and
   converting the DC voltage trim values to AC voltage trim values by multiplying the unity voltage reference value by the DC voltage trim value for each phase; and
   determining the phase command signal as the difference between the voltage reference command value and the AC voltage trim value for each phase.

3. The method of claim 2, wherein determining AC voltage trim values further comprises converting measured RMS line-to-line voltages to phase AC peak voltages.

4. The method of claim 3, wherein determining AC voltage trim values further comprises adjusting the DC voltage trim value based at least partially on an RMS current error value to derive an adjusted DC voltage trim value for each phase, and wherein converting the DC voltage trim values comprises multiplying the unity voltage reference value by the adjusted DC voltage trim value to determine the AC voltage trim values for each phase.

5. The method of claim 4, wherein adjusting the DC voltage trim value for each phase comprises:
   determining an RMS current reference value based at least partially on d and q axis current command values in the synchronous reference frame; and
   determining the RMS current error value based at least partially on the difference between the RMS current reference value and a calculated RMS phase current value for each phase.

6. The method of claim 1, wherein determining AC voltage trim values further comprises adjusting the DC voltage trim value based at least partially on an RMS current error value to derive an adjusted DC voltage trim value for each phase, and wherein converting the DC voltage trim values comprises multiplying the unity voltage reference value by the adjusted DC voltage trim value to determine the AC voltage trim values for each phase.

7. The method of claim 6, wherein adjusting the DC voltage trim value for each phase comprises:
   determining an RMS current reference value based at least partially on d and q axis current command values in the synchronous reference frame; and
   determining the RMS current error value based at least partially on the difference between the RMS current reference value and a calculated RMS phase current value for each phase.

8. The method of claim 1, wherein the active power converter is controlled at least partially using a current loop in a synchronous reference frame.

9. An active power conversion system for converting input electrical power to output electrical power, comprising:
   an input for receiving input electrical power from a multiphase AC voltage source;
   an output providing DC electrical power;
   a switch array converter comprising a plurality of switching devices operatively coupled between the input and the output and operative according to a plurality of switching control signals to selectively couple the input to the output; and
   a control system operatively coupled with the converter to provide the switching control signals to convert AC input power to output DC power, the control system comprising a current balancing component operative to control the converter to balance phase currents in the presence of unbalanced phase supply line voltages by determining DC voltage trim values for each phase at least partially according to the measured phase supply line voltages and operating the switching devices according to a phase command signal based at least partially on a phase voltage reference command value and the DC voltage trim value for each phase.

10. The active power converter of claim 9, wherein the control system is operative to determine d and q axis voltage command values in a synchronous reference frame based at least partially on measured phase supply line voltages and at least one feedback value and to convert the synchronous reference frame voltage command values to stationary phase voltage reference command values for each phase;
   wherein the current balancing component comprises:
      a unity voltage reference component operative to determine a peak voltage value in a stationary reference frame based at least partially on synchronous reference frame voltage command values and to determine unity voltage reference values as a ratio of the phase voltage reference command value to the peak voltage value for each phase;

a DC trim component with a feedforward voltage trim calculation component operative to determine a peak average of the phase supply line voltages and to determine a DC voltage trim value as the difference between the peak average of all the phase supply line voltages and the peak value of the individual phase supply line voltage for each phase;

a trim conversion component operative to convert the DC voltage trim values to AC voltage trim values by multiplying the unity voltage reference value by the DC voltage trim value for each phase; and a phase voltage compensation component operative to determine a phase command signal as the difference between the voltage reference value and the AC voltage trim value for each phase; and wherein the control system is operative to control the active power converter at least partially according to the phase command signals.

11. The active power converter of claim 10, wherein the feedforward voltage trim calculation component is further operative to convert measured RMS line-to-line voltages to phase AC peak voltages.

12. The active power converter of claim 11, wherein the DC trim component is further operative to adjust the DC voltage trim value based at least partially on an RMS current error value to derive an adjusted DC voltage trim value for each phase; and wherein the trim conversion component is operative to multiply the unity voltage reference value by the adjusted DC voltage trim value to determine the AC voltage trim values for each phase.

13. The active power converter of claim 12, wherein the DC trim component further comprises an RMS current regulator component operative to determine an RMS current reference value based at least partially on d and q axis current command values in the synchronous reference frame and to determine the RMS current error value based at least partially on the difference between the RMS current reference value and a calculated RMS phase current value for each phase.

14. The active power converter of claim 10, wherein the DC trim component is further operative to adjust the DC voltage trim value based at least partially on an RMS current error value to derive an adjusted DC voltage trim value for each phase; and wherein the trim conversion component is operative to multiply the unity voltage reference value by the adjusted DC voltage trim value to determine the AC voltage trim values for each phase.

15. The active power converter of claim 14, wherein the DC trim component further comprises an RMS current regulator component operative to determine an RMS current reference value based at least partially on d and q axis current command values in the synchronous reference frame and to determine the RMS current error value based at least partially on the difference between the RMS current reference value and a calculated RMS phase current value for each phase.

16. A computer readable medium with computer-executable instructions for controlling an active power converter providing a regulated DC output by switching current from a multiphase voltage source to balance phase currents in the presence of unbalanced phase supply line voltages, the computer readable medium comprising computer-executable instructions for:

measuring phase supply line voltage values of the input;

determining d and q axis voltage command values in a synchronous reference frame based at least partially on the measured phase supply line voltages;

converting the synchronous reference frame voltage command values to stationary phase voltage reference command values for each phase;

determining DC voltage trim values for each phase at least partially according to the measured phase supply line voltages;

determining a phase command signal based at least partially on the phase voltage reference command value and the DC voltage trim value for each phase; and controlling the active power converter at least partially according to the phase command signals.

17. The computer readable medium of claim 16, further comprising computer-executable instructions for:

determining a peak voltage value in the stationary reference frame based at least partially on the synchronous reference frame voltage command values;

determining unity voltage reference values as a ratio of the phase voltage reference command value to the peak voltage value for each phase;

determining a peak average of the phase supply line voltages;

determining AC voltage trim values for each phase, comprising:

determining the DC voltage trim value as the difference between the peak average of all the phase supply line voltages and the peak value of the individual phase supply line voltage for each phase, and converting the DC voltage trim values to AC voltage trim values by multiplying the unity voltage reference value by the DC voltage trim value for each phase; and determining the phase command signal as the difference between the voltage reference command value and the AC voltage trim value for each phase.

18. The computer readable medium of claim 17, wherein the computer-executable instructions for determining AC voltage trim values further comprises computer-executable instructions for converting measured RMS line-to-line voltages to phase AC peak voltages.

19. The computer readable medium of claim 17, wherein the computer-executable instructions for determining AC voltage trim values further comprises computer-executable instructions for adjusting the DC voltage trim value based at least partially on an RMS current error value to derive an adjusted DC voltage trim value for each phase, and wherein the computer-executable instructions for converting the DC voltage trim values comprises computer-executable instructions for multiplying the unity voltage reference value by the adjusted DC voltage trim value to determine the AC voltage trim values for each phase.

20. The computer readable medium of claim 19, wherein the computer-executable instructions for adjusting the DC voltage trim value for each phase comprises:

computer-executable instructions for determining an RMS current reference value based at least partially on d and q axis current command values in the synchronous reference frame; and computer-executable instructions for determining the RMS current error value based at least partially on the difference between the RMS current reference value and a calculated RMS phase current value for each phase.

* * * * *